(12) United States Patent
Ushinohama et al.

(10) Patent No.: US 12,419,295 B2
(45) Date of Patent: Sep. 23, 2025

(54) FISHING ROD

(71) Applicant: GLOBERIDE, Inc., Higashikurume (JP)

(72) Inventors: Kosuke Ushinohama, Higashikurume (JP); Yoshinori Nakahata, Higashikurume (JP); Yoshinao Kato, Higashikurume (JP); Hiroshi Sezai, Higashikurume (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 18/832,539

(22) PCT Filed: Feb. 7, 2023

(86) PCT No.: PCT/JP2023/003910
§ 371 (c)(1),
(2) Date: Jul. 24, 2024

(87) PCT Pub. No.: WO2023/162665
PCT Pub. Date: Aug. 31, 2023

(65) Prior Publication Data
US 2025/0098655 A1      Mar. 27, 2025

(30) Foreign Application Priority Data
Feb. 25, 2022   (JP) ................ 2022-028203

(51) Int. Cl.
*A01K 97/08*    (2006.01)
*A01K 87/02*    (2006.01)

(52) U.S. Cl.
CPC ........... *A01K 97/08* (2013.01); *A01K 87/025* (2013.01)

(58) Field of Classification Search
CPC .............................. A01K 97/08; A01K 87/025
See application file for complete search history.

(56) References Cited

U.S. PATENT DOCUMENTS 3,618,253 A * 11/1971 Edwards et al. ..... A01K 87/025
403/109.8

FOREIGN PATENT DOCUMENTS

| JP | S55-3780 A | 1/1980 |
|----|-----------|--------|
| JP | S61-83871 U | 6/1986 |

(Continued)

OTHER PUBLICATIONS

Mar. 14, 2023 International Search Report issued in International Patent Application No. PCT/JP2023/003910.

(Continued)

*Primary Examiner* — Richard G Davis
(74) *Attorney, Agent, or Firm* — Oliff PLC

(57) ABSTRACT

A fishing rod capable of reducing a dimension when stored, the fishing rod having a structure that is difficult to move even when the fishing rod is accommodated in a bag or the like. A fishing rod of the invention includes a cylindrical cover member that is attached to an original rod that stores a plurality of rods so that the plurality of rods do not protrude. The cover member can constitute a rear grip to be attached to and detached from the original rod, and the original rod and the cover member are provided with an adjustment mechanism capable of adjusting a dimension when stored by changing an attachment position of the cover member when the cover member is attached to the original rod.

10 Claims, 16 Drawing Sheets

(56) References Cited

FOREIGN PATENT DOCUMENTS

| | | | | |
|---|---|---|---|---|
| JP | 2000-279064 A | 10/2000 | | |
| JP | 2021101687 A | * 7/2021 | ............. | A01K 87/04 |

OTHER PUBLICATIONS

Apr. 24, 2025 Office Action issued in Japanese Patent Application No. 2022-028203.
Aug. 27, 2024 International Preliminary Report on Patentability issued in International Patent Application No. PCT/JP2023/003910.

* cited by examiner

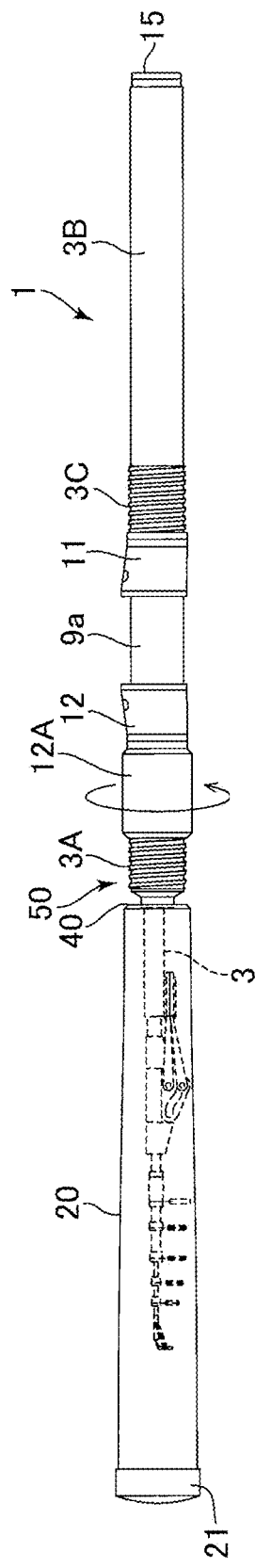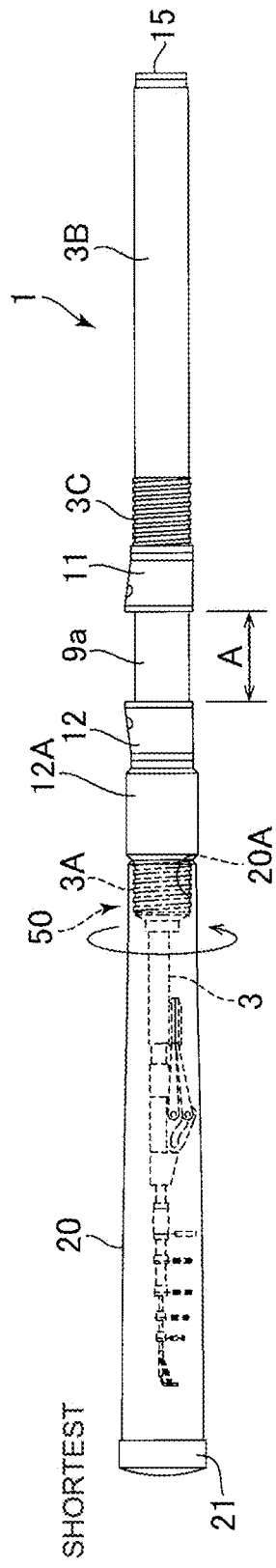
FIG. 4A-1
FIG. 4A-2

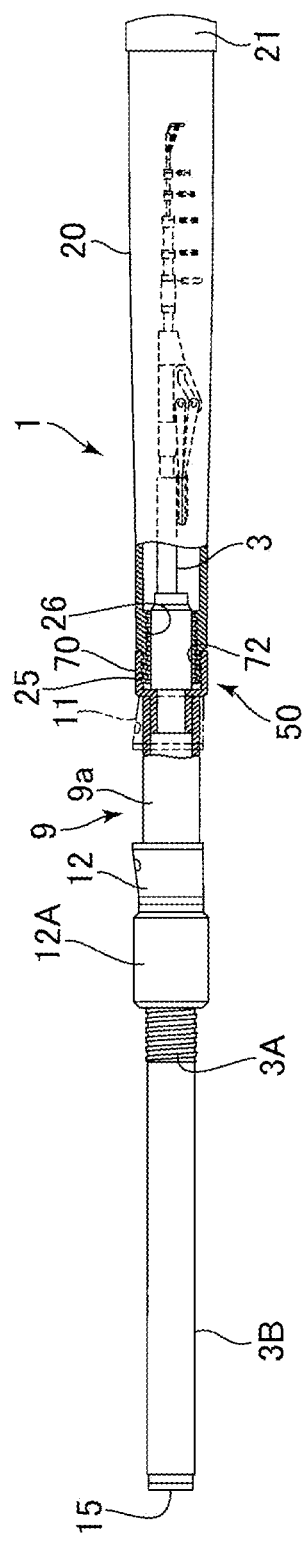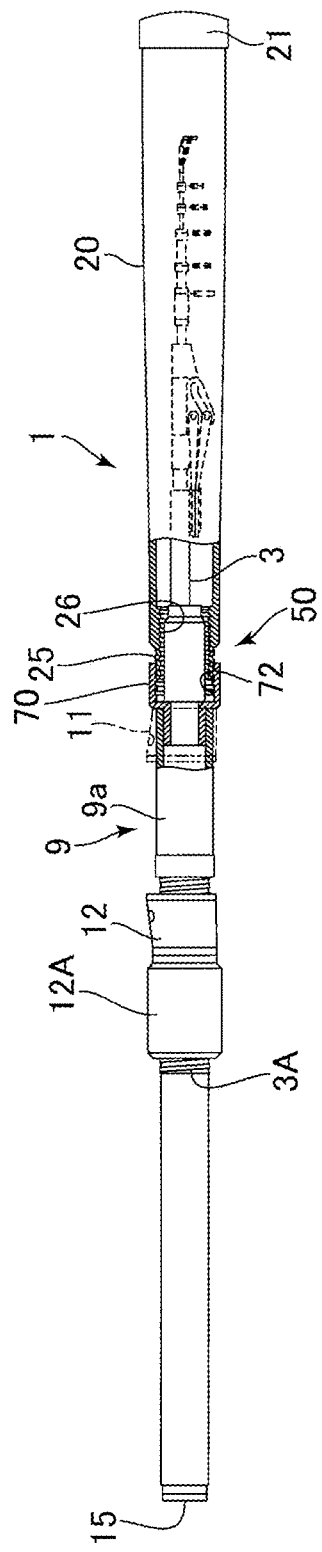
FIG. 6A
FIG. 6B

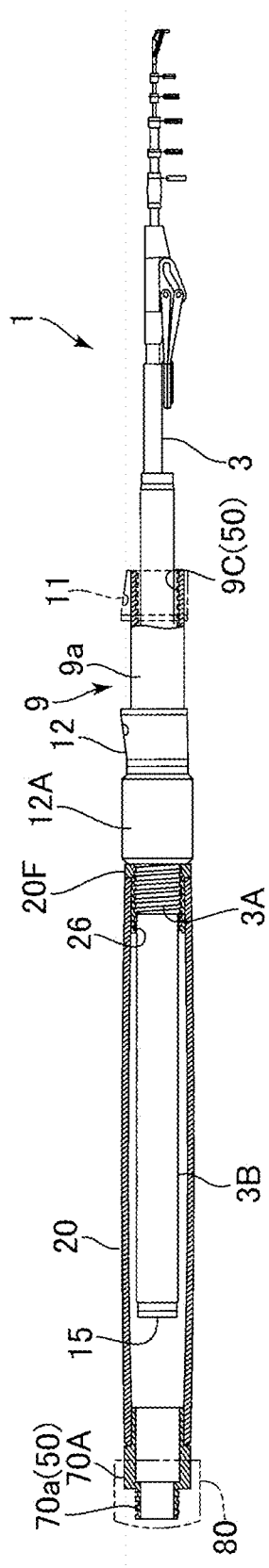
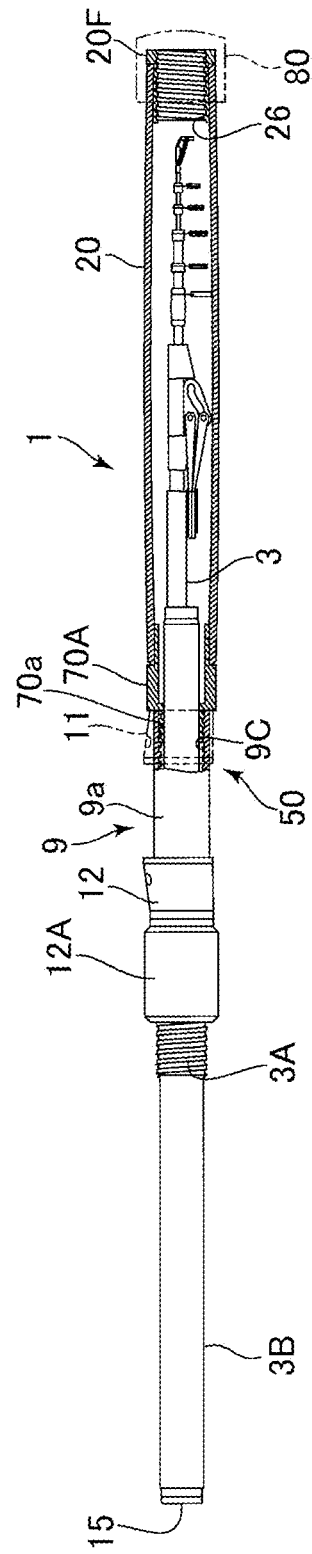
FIG. 7A
FIG. 7B

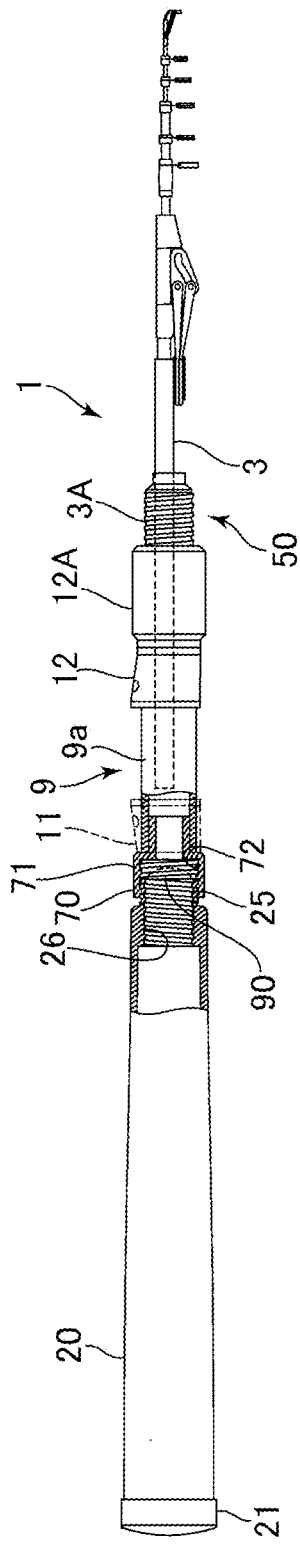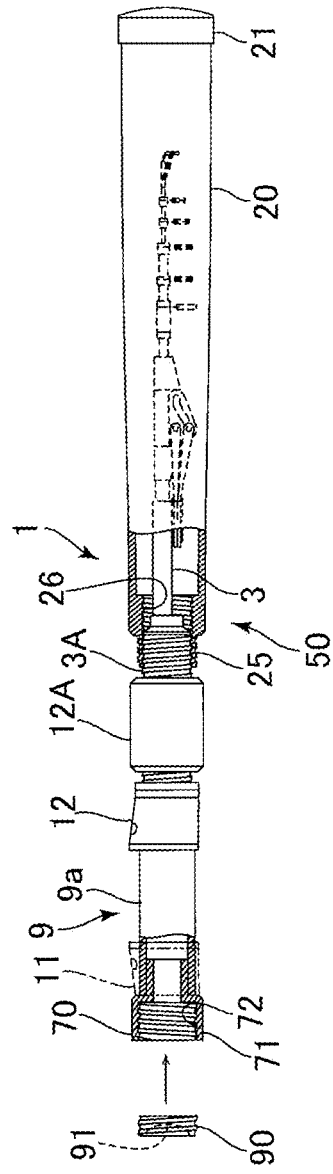
FIG. 10A
FIG. 10B

FISHING ROD

TECHNICAL FIELD

The present invention relates to a fishing rod, and more specifically, to a fishing rod capable of shortening a dimension when stored.

BACKGROUND ART

In recent years, in fishing, fishing rods that can have a short dimension when stored at the time of transportation (also referred to as mobile rods) are attracting attention due to the difficulty of carrying long rods, restrictions imposed by shipping companies making it impossible to transport them, and rising transportation costs. As such a mobile rod, for example, Patent Literature 1 discloses a configuration in which an original rod for sequentially storing a large number of telescopic rods is shortened, and a cylindrical cover member is attached to the original rod. The cover member is disposed so as to cover the entire fishing line guide of each rod and the entire rod, and can be detached at the time of use and connected to the rear end of the original rod to form a grip.

CITATION LIST

Patent Literature

Patent Literature 1: JP 2021-101687 A

SUMMARY OF INVENTION

Technical Problem

When the fishing rod disclosed in Patent Literature 1 described above is stored in a bag, a backpack, or the like (hereinafter collectively referred to as a bag or the like) and carried, if a gap is generated between the fishing rod and the fishing rod, the fishing rod itself moves in the bag or the like and may be damaged or broken.

The present invention has been made in view of the above problems, and an object of the present invention is to provide a fishing rod capable of reducing the dimension when stored, the fishing rod having a structure that is difficult to move even when the fishing rod is accommodated in a bag or the like.

Solution to Problem

In order to achieve the above object, a fishing rod according to the present invention comprises a cylindrical cover member attached to an original rod storing a plurality of rods so that the plurality of rods does not protrude, the cover member being capable of constituting a rear grip attached to and detached from the original rod, in which the original rod and the cover member are provided with an adjustment mechanism capable of adjusting a dimension when stored by changing an attachment position of the cover member when the cover member is attached to the original rod.

With the fishing rod having the above-described configuration, by attaching the cylindrical cover member to the original rod, protrusion of the plurality of rods stored in the original rod can be prevented, and at the time of use, the cover member can be removed and attached to the original rod to form the rear grip, so that it is possible to improve operability at the time of use and shorten the dimension when stored. In addition, in the original rod and the cover member, when the cover member is attached to the original rod, the dimension when stored can be adjusted by changing the attachment position of the cover member by the adjustment mechanism, and the dimension in an axial direction can be adjusted according to the size of the storage unit of the bag or the like to prevent the fishing rod from moving.

In addition, a fishing rod according to the present invention comprises a reel seat comprising a reel leg placement portion for fixing a reel leg of a fishing reel, and a pair of hoods provided on a front side and a rear side of the reel leg placement portion for fastening and fixing the reel leg, an original rod integrated with the reel seat and storing a plurality of rods, and a cylindrical cover member to which the plurality of rods is attached so as not to protrude, in which the cover member is capable of constituting a rear grip to be attached to and detached from the reel seat or the original rod, and the reel seat or the original rod and the cover member are provided with an adjustment mechanism capable of adjusting a dimension when stored by changing an attachment position of the cover member.

The adjustment mechanism of the fishing rod according to the present invention may be configured to be provided on the reel seat or the original rod and the cover member as described above.

Advantageous Effects of Invention

According to the present invention, it is possible to obtain a fishing rod capable of being shortened in dimension when stored, the fishing rod having a structure that is difficult to move even when the fishing rod is accommodated in a bag or the like.

BRIEF DESCRIPTION OF DRAWINGS

FIG. 1 is a view illustrating a first embodiment of a fishing rod according to the present invention, in which

FIG. 2 is a view in which

FIG. 4 is a view for describing dimensions of the fishing rod when stored, in which (FIG. 4A-1 and FIG. 4A-2) is a view illustrating a shortest state when stored, and (FIG. 4B-1 and FIG. 4B-2) is a view illustrating a longest state when stored.

FIG. 6 is a view in which FIG. 6A is a view illustrating a short stored state and FIG. 6B is a view illustrating a long stored state in the fishing rod illustrated in FIG. 5.

FIG. 7 is a view illustrating a third embodiment of a fishing rod according to the present invention, in which FIG. 7A is a view illustrating a state of being used as a fishing rod, and FIG. 7B is a view illustrating a stored state.

FIG. 10 is a view illustrating a sixth embodiment of a fishing rod according to the present invention, in which FIG. 10A is a view illustrating a state of being used as a fishing rod and FIG. 10B is a view illustrating a stored state.

FIG. 13 is a view illustrating a ninth embodiment of a fishing rod according to the present invention, in which

DESCRIPTION OF EMBODIMENTS

Figure 3:
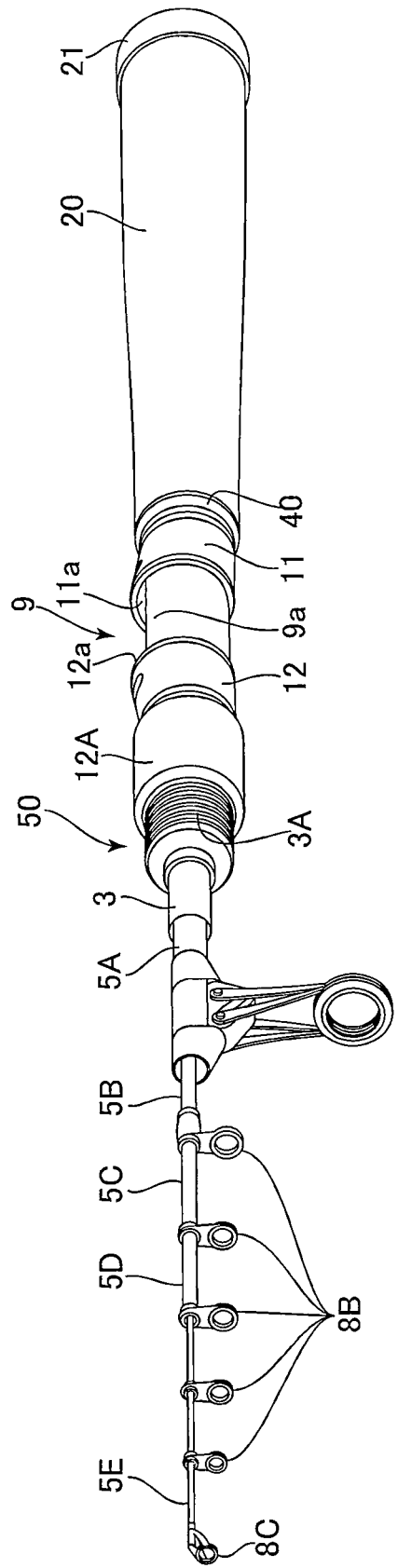
FIG. 3 is a view illustrating a state of being used as a fishing rod.
Figures 1, 4B:
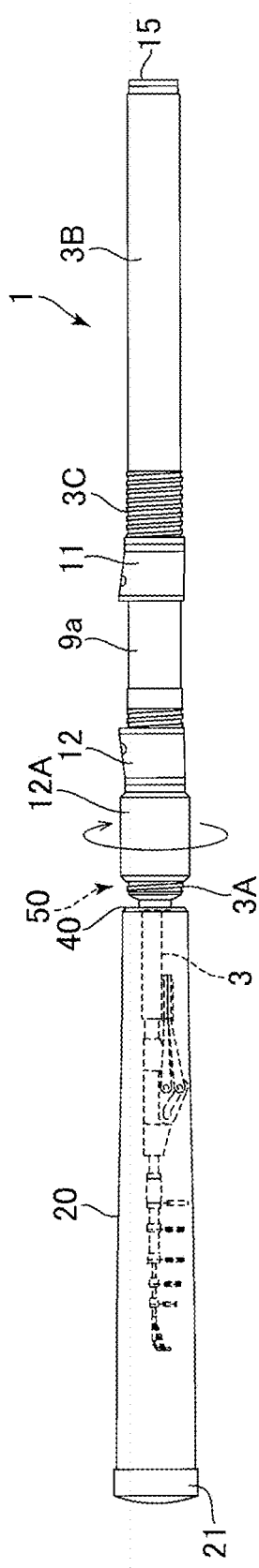
Figures 2, 4B:
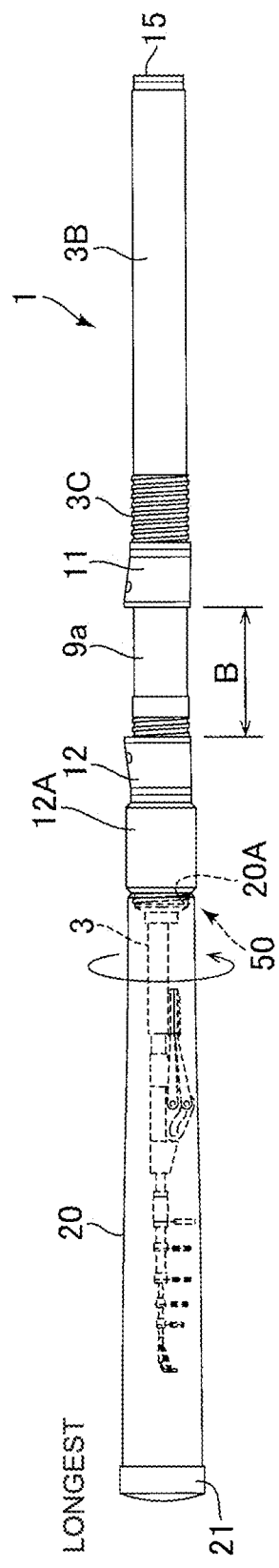

FIGS. 1 to 3 are views illustrating a first embodiment of a fishing rod (mobile rod) according to the present invention.

A fishing rod 1 illustrated in the drawings is configured as a telescopic type in which a plurality of rods 5A, 5B, 5C, 5D, and 5E is stored in the original rod 3 and sequentially pulled out and joined. The number of rods (the number of joining rods) stored inside the original rod 3 is arbitrary, and in the configuration illustrated in the drawings, the rod 5E having the smallest diameter is the tip rod.

Fishing line guides 8A, 8B, and 8C for guiding the fishing line are attached to the original rod 3 and the plurality of rods 5A, 5B, 5C, 5D, and 5E. In the fishing rod of the present embodiment, among various fishing reels, a spinning reel is expected to be used, and the guide leg becomes high, so that the fishing line guide 8A arranged closest to the proximal end side is configured to be a foldable type. In addition, the fishing line guides 8B comprise one fixed at a distal end of the rod with a line stopper or the like and ones (floating guide) that slide along the rod and are fixed at predetermined positions. Furthermore, the fishing line guide 8C is a top guide fixed to the distal end of the rod (tip rod) 5E.

A reel seat 9 having a reel leg placement portion 9a is disposed on a proximal end side of the original rod 3. A pair of hoods for fastening and fixing the reel leg placed on the reel leg placement portion 9a is provided in front of and behind the reel seat 9 in the axial direction. The pair of hoods of the present embodiment comprises a fixed hood 11 provided on the rear side in the axial direction of the reel leg placement portion 9a and a moving hood 12 provided on the front side in the axial direction and moving in the axial direction.

Note that the original rod 3 and the reel seat 9 may be integrally formed, or may be separately formed and integrated. In addition, the amount of protrusion of the original rod 3 from the moving hood portion is arbitrary. Furthermore, as will be described later, the moving hood may be provided behind the reel leg placement portion 9a, or the moving hoods may be disposed on both sides of the reel leg placement portion 9a.

The fixed hood 11 is fixed to an outer peripheral surface of a proximal end side of the original rod 3, and comprises a receiving hole 11a opened toward the reel leg placement portion 9a. The moving hood 12 also comprises an opening portion 12a that opens toward the reel leg placement portion 9a. The moving hood 12 comprises an operation nut 12A in which a female screw portion to be screwed with a male screw portion 3A provided in front (hood region) of the moving hood 12 of the original rod 3 is formed. In this case, the operation nut 12A and the moving hood 12 are connected by a known engagement structure, and when the operation nut 12A is rotationally operated to move in the axial direction, the moving hood 12 is moved closer to/away from the fixed hood 11 without causing the moving hood 12 to rotate together.

Thus, a reel leg (not illustrated) is placed on the reel leg placement portion 9a, the rear side is fitted into the receiving hole 11a of the fixed hood 11, and the operation nut 12A is rotated, whereby the reel leg is fastened and fixed by the moving hood 12 and the fixed hood 11. Note that, although the male screw portion 3A screwed with the operation nut 12A is formed on the outer peripheral surface of the original rod 3, a tubular reel seat (tubular seat main body) may be externally fitted to the outer peripheral surface of the original rod 3 and formed on the outer peripheral surface of the reel seat.

In the original rod 3, a protruding portion 3B protruding in the axial direction is formed on the rear side of a portion (fixed hood 11) where the reel leg is fixed. Since the plurality of rods 5A to 5E is stored in the protruding portion 3B, the protruding portion 3B has a predetermined length in the axial direction. Further, a lower plug (rear plug) 15 is detachably attached to a proximal end of the protruding portion 3B to prevent the rods 5A to 5E to be accommodated from coming off. Note that, by removing the lower plug 15, it is possible to maintain each rod.

Further, in the present embodiment, a male screw portion (male screw portion for rear grip) 3C is formed on the outer peripheral surface of the protruding portion 3B. The male screw portion 3C is formed adjacent to the fixed hood 11 (formed in the hood region), and a female screw portion of a cover member 20 below is screwed together to form a rear grip by the cover member 20.

As illustrated in FIG. 1, a cylindrical cover member 20 having a function of preventing the plurality of rods 5A to 5E stored in the original rod 3 from protruding is detachably attached to the original rod 3 along the axial direction. The cover member 20 of the present embodiment is formed in a cylindrical shape so as to have a large diameter as it shifts to the distal end, and the distal end portion is in a closed state (detachable lid body 21 is attached) so that a plurality of rods does not protrude. In addition, the cover member 20 can protect the rods by being formed by a hard material such as a fiber-reinforced resin, wood, or metal.

It is preferable that a lid body 21 is formed by a flexible member such as EVA so that the fishing line guide or the distal end of each rod is not damaged even if the rods 5A to 5E abut on the lid body. In addition, the lid body 21 may be detachably attached to the cover member 20 by press fitting, screw coupling, or the like, or may be fixed by adhesion or the like. Alternatively, the lid body 21 may be integrated with the cover member 20.

As described above, the cover member 20 has a function as a rear grip by being attached to the protruding portion 3B of the original rod 3 in addition to the function of preventing the plurality of rods 5A to 5E from protruding, and is configured to be fixed to a front side and a rear side of the original rod 3. That is, as illustrated in FIG. 1, the cover member 20 is fixed to the front side to be in a stored state in which the rod is prevented from protruding, and as illustrated in FIGS. 2 and 3, the cover member 20 is fixed on the rear side to be in a rear grip state.

Figure 1A:
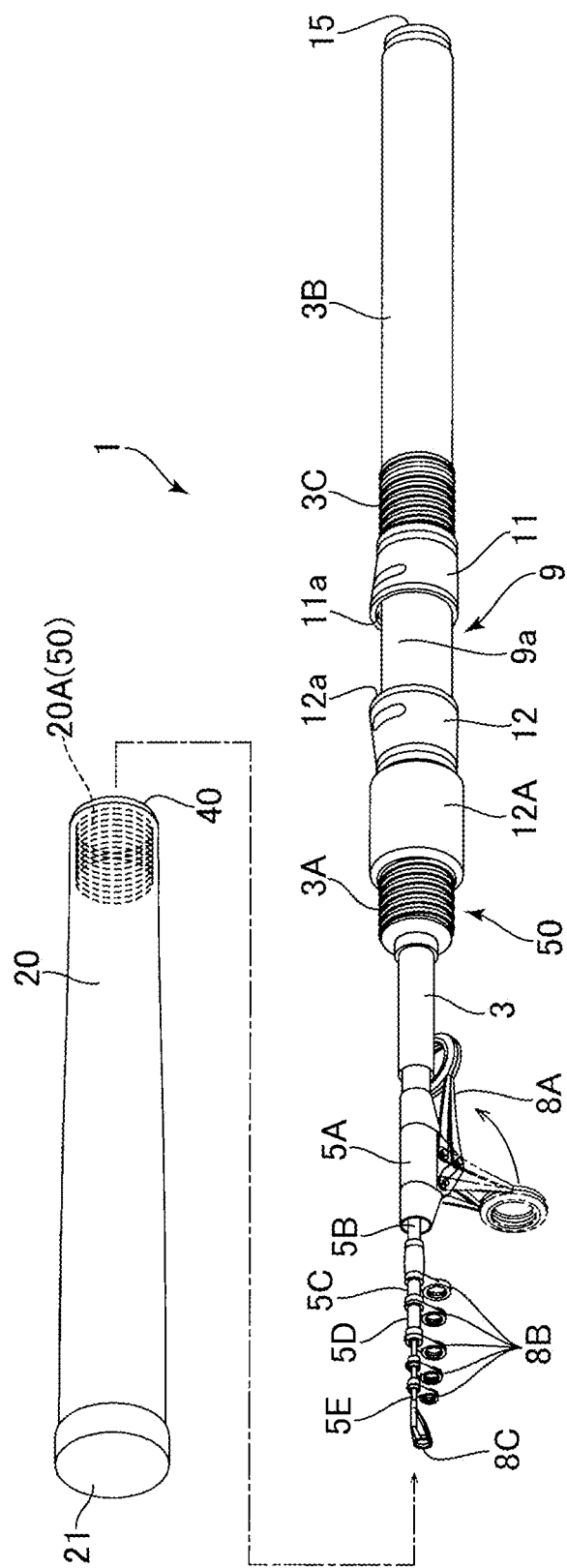
FIG. 1A is a view illustrating a state in which a cover member is removed from an original rod.
Figure 1B:
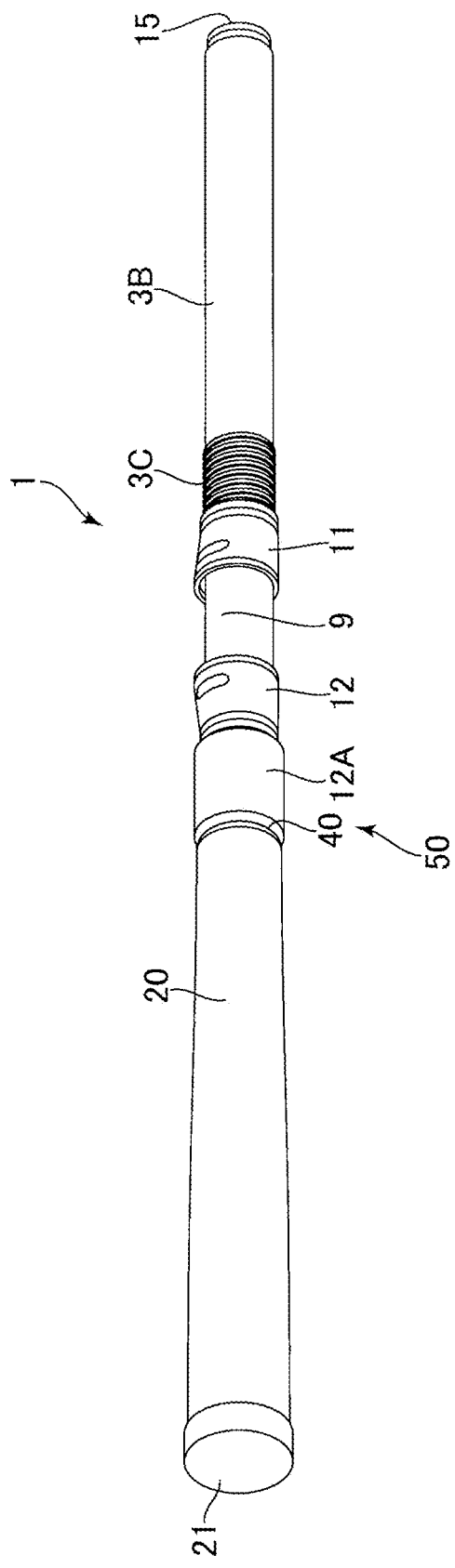
FIG. 1B is a view illustrating a state in which a cover member is attached.

The original rod 3 and the cover member 20 are provided with an adjustment mechanism 50 capable of adjusting the dimension when stored by changing the attachment position (position fixed with respect to the axial direction) of the cover member 20 when the cover member 20 is attached to the original rod 3. That is, it is configured so that the fixing position of the cover member 20 can be adjusted in the axial direction at the time of bringing it into a stored state as illustrated in FIG. 1B, thereby preventing generation of a gap with an inner surface of a bag or the like when accommodated in the bag or the like.

A fixing means on the front side and the rear side of the cover member 20 is not limited, but in the present embodiment, the female screw portion 20A is formed on an inner surface of an opening region of the cover member 20, and the female screw portion 20A is screwed to the male screw portions 3A and 3C of the original rod 3 to be fixed. That is, the fixing means may be constituted by press fitting or the like, but by screwing, the fixed state can be reliably maintained without rattling.

Since the fixing means on the front side and the rear side of the cover member 20 with respect to the original rod has the above-described screwing structure, the adjustment mechanism 50 can be constituted by the female screw portion 20A formed on the cover member 20 and the male screw portion 3A on which the operation nut 12A of the moving hood 12 for fixing the reel leg is disposed. That is, the fixing position of the cover member 20 can be adjusted within the range of the length in the axial direction of the male screw portion 3A, whereby the dimension when stored can be adjusted. Further, in the present embodiment, an opening end edge of the cover member 20 is configured to abut on a distal end edge of the operation nut 12A, and the fixed state is maintained without the cover member 20 moving to the proximal end side in the axial direction.

Next, a method of using the above-described fishing rod will be described with reference to FIGS. 1 to 4.

When the fishing rod 1 is not used (at the time of being stored), as illustrated in FIG. 1, the cover member 20 covers (is attached to) the front side from the male screw portion 3A of the original rod 3 by screwing the female screw portion 20A with the male screw portion 3A on the front side of the original rod 3. Thus, the plurality of rods accommodated in the original rod 3 does not pop out, and the fishing line guides 8A to 8C positioned at the distal end portion of each rod and the distal end of each rod are protected by the lid body 21 formed by a flexible member. Further, in this state, each rod does not come out rearward by the lower plug 15.

At the time of being stored, it is possible to adjust the dimension when stored by changing the attachment position (the fixing position with respect to the axial direction) of the cover member 20 by the adjustment mechanism 50.

FIG. 4 (A-1 and A-2) is a view illustrating a shortest stored state.

In this example, by rotating the operation nut 12A in the arrow direction to move the moving hood 12 to the side closest to the fixed hood 11, the exposed length of the male screw portion 3A can be increased. In this state, the cover member 20 is rotated so as to be closest to the proximal end side, and the opening end edge of the cover member is caused to abut on the distal end edge of the operation nut 12A, whereby the fixing position of the cover member 20 in the axial direction is shifted to the proximal end side of the original rod, and the dimension when stored can be shortened (the axial length A of the reel leg placement portion 9a is the shortest).

FIG. 4 (B-1 and B-2) is a view illustrating a longest stored state.

In this example, by rotating the operation nut 12A in the arrow direction and moving the moving hood 12 to the side away from the fixed hood 11, the exposed length of the male screw portion 3A can be shortened. The exposure length may be any length as long as the female screw portion 20A of the cover member 20 can be screwed and fixed, and in this state, by rotating the cover member 20 to cause the opening end edge of the cover member to abut on the distal end edge of the operation nut 12A, the fixing position of the cover member 20 in the axial direction is shifted to the front side of the original rod, and the dimension when stored can be increased (the axial length B of the reel leg placement portion 9a is the longest).

As described above, since the adjustment mechanism 50 of the present embodiment has a structure using the male screw portion 3A of the moving hood 12 and the female screw portion 20A of the cover member 20, simplification can be achieved, and the opening end edge of the cover member 20 is caused to abut on the distal end edge of the operation nut 12A to fix the position thereof, so that a stable fixed state can be obtained without the cover member moving in the axial direction.

Note that the cover member 20 and the operation nut 12A are preferably formed so as to be substantially flush with each other in a fixed state.

Since the cover member 20 and the operation nut 12A are flush with each other in this manner, it is possible to make it difficult to catch another object when accommodated in the bag or the like.

In addition, it is preferable to provide a soft member 40 interposed between the opening end edge of the cover member 20 and the distal end edge of the operation nut 12A on at least one of the opening end edge or the distal end edge. The soft member 40 can be formed by, for example, plastic, rubber, or the like, and as illustrated in the drawing, by being attached to the opening end edge of the cover member 20, when brought into the stored state, the soft member firmly abuts on the distal end edge of the operation nut 12A and prevents rattling, and it is possible to prevent cracking or the like of the opening edge of the cover member.

Note that, in the above configuration, a ring nut (see FIGS. 8 and 9 to be described later) may be separately disposed on the male screw portion 3A on which the operation nut 12A is disposed. By disposing such a ring nut, the ring nut can be caused to abut on the opening end edge of the cover member 20 screwed with the male screw portion 3A, so that the position of the cover member 20 can be fixed while the reel leg is fixed to the reel leg placement portion 9a (the position of the operation nut 12A is not changed). That is, by causing the ring nut to abut on the opening end edge of the cover member 20 in a state where the reel is fixed between the fixed hood 11 and the moving hood 12, it is possible to adjust the dimension when stored.

In the above-described configuration, when the fishing rod 1 is used, the cover member 20 is taken out in the axial direction from the male screw portion 3A on which the operation nut 12A is disposed. Then, as illustrated in FIG. 2, the cover member 20 is placed on the protruding portion 3B with the opposite side, and the female screw portion 20A of the cover member 20 is screwed with the male screw portion 3C formed in the protruding portion 3B. In this state, the soft member 40 attached to the opening end edge of the cover member 20 firmly abuts on the rear end edge of the fixed hood 11 and prevents rattling, and cracking or the like of the opening edge of the cover member can be prevented.

Figure 2A:
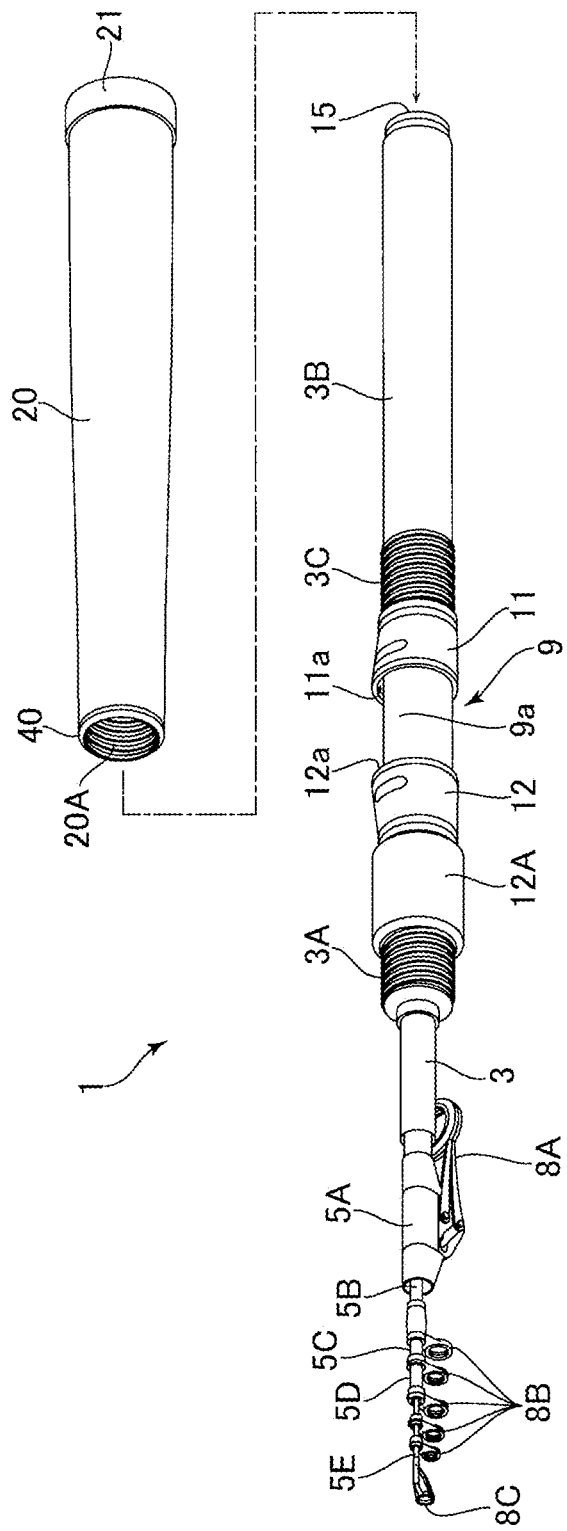
FIG. 2A is a view illustrating a view illustrating a state in which a cover member is used as a rear grip with respect to an original rod in the fishing rod illustrated in FIG. 1.
Figure 2B:
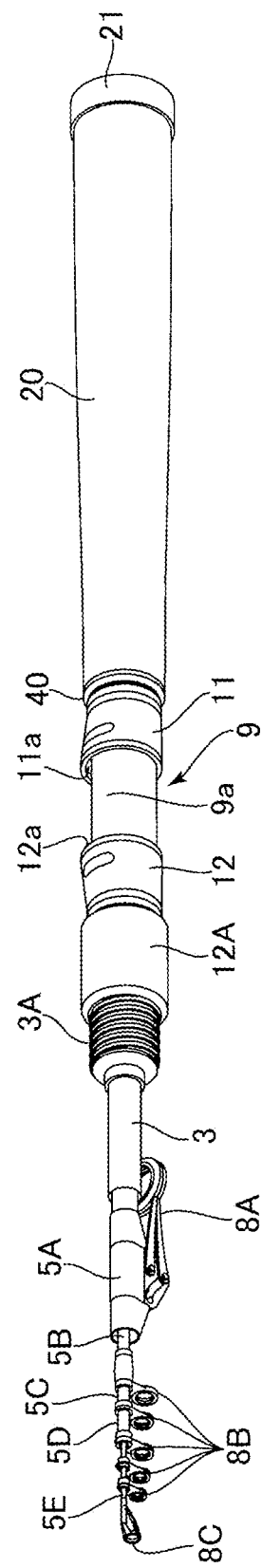
FIG. 2B is a view illustrating a state in which the cover member is attached to the original rod and is used as the rear grip.

Thus, as illustrated in FIGS. 2B and 3, the cover member 20 can exhibit a function as a rear grip. Further, in addition, the cover member 20 of the present embodiment is formed so as to change in diameter along the axial direction, and thus, in the case of being used as a grip, the diameter is increased toward the rear side, and the grasping property can be improved.

Note that, in the above configuration, the position where the male screw portion 3C is provided with respect to the protruding portion 3B (the fixing position of the cover member 20) is arbitrary. For example, it is also possible to increase the length of the rear grip in the case of being used as a fishing rod by forming the rear grip on the proximal end side of the protruding portion 3B.

Next, other embodiments of the present invention will be described.

Note that, in the embodiment to be described below, portions having functions similar to those of the first embodiment described above are denoted by the same reference numerals, and detailed description thereof will be omitted.

Figure 5:
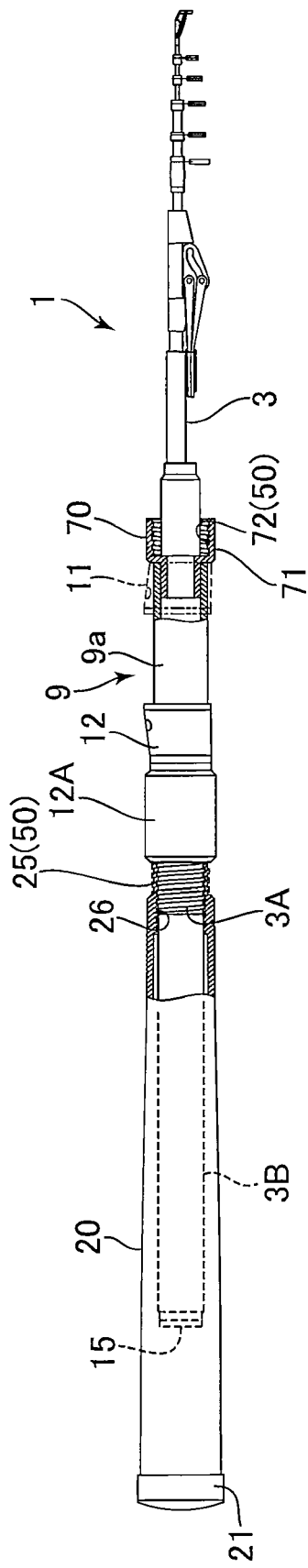
FIG. 5 is a view illustrating a second embodiment of a fishing rod according to the present invention, and a view illustrating a state of being used as a fishing rod.

FIGS. 5 and 6 are views illustrating a second embodiment, in which FIG. 5 is a view illustrating a state of being used as a fishing rod, FIG. 6A is a view illustrating a short stored state, and FIG. 6B is a view illustrating a long stored state.

In this embodiment, the fixed hood 11 is provided on the front side (rod tip side) of the reel leg placement portion 9a, and the moving hood 12 is provided on the rear side (proximal end side) thereof.

The operation nut 12A of the moving hood 12 is screwed with the male screw portion 3A formed on the protruding portion 3B of the original rod 3, and the moving hood 12 is moved in the axial direction by rotating the operation nut 12A.

A female screw portion 26 is formed on an inner surface of an opening portion at a distal end of the cover member 20, and is configured to be screwed with the male screw portion 3A. In the opening portion of the cover member 20, a male screw portion 25 is further formed to protrude forward from the region where the female screw portion 26 is formed. The male screw portion 25 is used at the time of being attached to the front side of the original rod 3 to be in a stored state, and constitutes the adjustment mechanism 50. The male screw portion 25 is arranged side by side with the female screw portion 26 in the axial direction, but may be formed directly on the outer surface of the cover member 20 so as to overlap with the female screw portion 26.

A separate joining component 70 is attached to the fixed hood 11. The joining component 70 comprises a cylindrical portion 71 fixed to a radially inner side of the fixed hood 11 and enlarged in diameter on the front side of the fixed hood 11, and a female screw portion 72 constituting the adjustment mechanism 50 is formed on the inner surface of the cylindrical portion 71. That is, the female screw portion 72 is formed in the hood region and is configured to be screwed with the male screw portion 25 of the cover member 20.

With the above configuration, the operation nut 12A is rotationally operated to move the moving hood 12 in the axial direction to fix the reel to the reel leg placement portion 9a, and the female screw portion 26 of the cover member 20 is screwed with the exposed male screw portion 3A, so that the cover member 20 can function as a rear grip (see FIG. 5). Further, by removing the cover member 20 and directing the cover member 20 to the opposite side, and screwing the male screw portion 25 with the female screw portion 72 of the joining component 70, it can be brought into a stored state. In this case, by shifting the screwing position between the male screw portion 25 of the cover member 20 and the female screw portion 72 of the joining component 70 in the axial direction, it is possible to adjust the dimension when stored as illustrated in FIGS. 6A and 6B. Note that FIG. 6A is a view illustrating a short stored state in which the cover member 20 is tightened the most, and FIG. 6B is a view illustrating a long stored state in which the cover member 20 is screwed on the end side.

FIG. 7 is a view illustrating a third embodiment, in which FIG. 7A is a view illustrating a state of being used as a fishing rod, and FIG. 7B is a view illustrating a stored state.

In this embodiment, a connection structure for use as a fishing rod and a connection structure for bringing it into a stored state are provided on both sides of the cover member 20.

Specifically, the female screw portion 26 is formed on one end side (the opening side of the above-described embodiment) of the cover member 20. The female screw portion 26 may be formed directly on the inner peripheral surface on the opening side of the cover member 20, or as illustrated in the drawing, the female screw portion 26 may be formed on the inner surface of a screw forming component 20F as a separate member, and the screw forming component 20F may be press-fitted and bonded to one end side of the cover member 20. A joining component 70A is press-fitted and fixed to the other end side of the cover member 20. A male screw portion 70a is formed on the protruding side of the joining component 70A. Then, inside the fixed hood 11 provided on the front side (rod tip side) of the reel leg placement portion 9a, a female screw portion 9C integrally formed on the front side of the reel leg placement portion 9a of the reel seat 9 is provided.

With the above configuration, the operation nut 12A is rotationally operated to move the moving hood 12 in the axial direction to fix the reel to the reel leg placement portion 9a, and the female screw portion 26 on one end side of the cover member 20 is screwed with the exposed male screw portion 3A, so that the cover member 20 can function as a rear grip (see FIG. 7A). Further, the cover member 20 is removed, and the male screw portion 70a of the joining component 70A on the other end side is directly screwed with the female screw portion 9C without being directed to the opposite side, so that it can be brought into a stored state (see FIG. 7B). In this case, the dimension when stored can be adjusted by axially shifting the screwing position between the male screw portion 70a of the cover member 20 and the female screw portion 9C.

Note that, in the above configuration, since one end side of the cover member 20 is opened in the stored state, the cap member 80 as a separate component may be separately mounted. In addition, the cap member 80 may be configured to be attached to the other end side of the cover member 20 when a fishing rod is used. In this case, as long as the outer diameter dimensions of the one end side and the other end side of the cover member are different, the cover member may be formed by a flexible member that can be displaced in the radial direction, or a joining structure that can be attached to a plurality of outer diameters may be formed.

Figure 8:
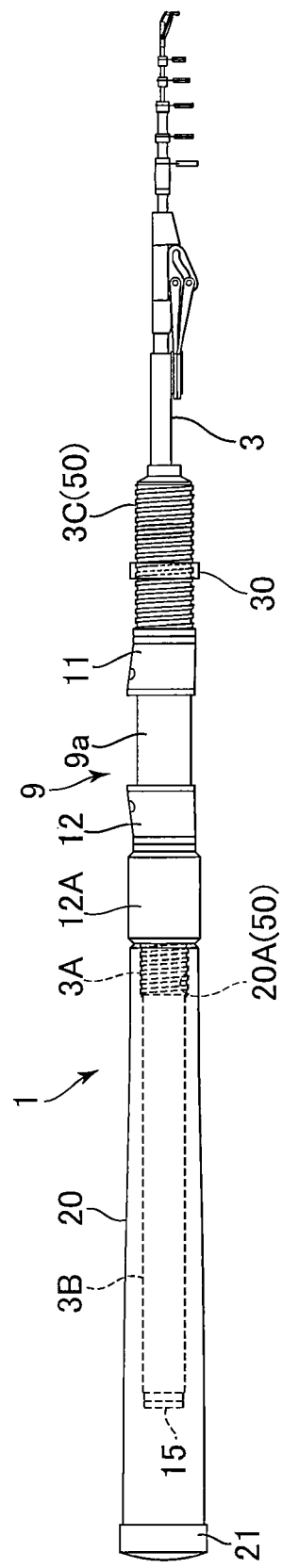
FIG. 8 is a view illustrating a fourth embodiment of a fishing rod according to the present invention, and a view illustrating a state of being used as a fishing rod.

FIG. 8 is a view illustrating a fourth embodiment, and is a view illustrating a state of being used as a fishing rod.

In this embodiment, the fixed hood 11 is provided on the front side (rod tip side) of the reel leg placement portion 9a, and the moving hood 12 is provided on the rear side (proximal end side) thereof.

In this embodiment, the operation nut 12A of the moving hood 12 is screwed with the male screw portion 3A formed on the protruding portion 3B of the original rod 3, and the moving hood 12 is moved in the axial direction by rotating the operation nut 12A. A female screw portion 20A is formed on an inner surface of an opening portion at a distal end of the cover member 20, and is configured to be screwed with the male screw portion 3A in a use state. Further, a male screw portion 3C is formed in front of the fixed hood 11, and is configured so that the female screw portion 20A of the cover member 20 is screwed in the stored state.

A ring nut 30 is separately disposed on the male screw portion 3C. By disposing such a ring nut 30, the ring nut can be caused to abut on the opening end edge of the cover member 20 screwed with the male screw portion 3C at the time of adjusting the dimension when stored, so that the cover member 20 can be fixed at that position without rattling.

Figure 9:
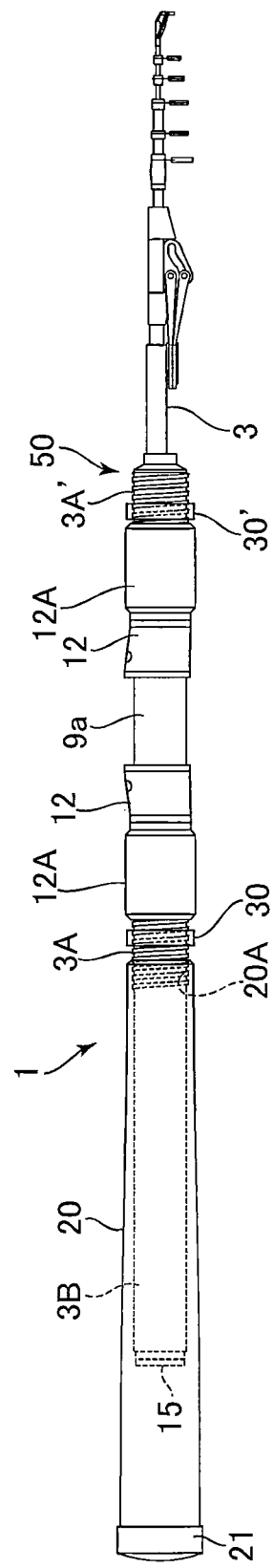
FIG. 9 is a view illustrating a fifth embodiment of a fishing rod according to the present invention, and a view illustrating a state of being used as a fishing rod.

FIG. 9 is a view illustrating a fifth embodiment, and is a view illustrating a state of being used as a fishing rod.

In this embodiment, the moving hood 12 is provided on the front side and the rear side of the reel leg placement portion 9a. Ring nuts 30 and 30' are respectively disposed on male screw portions 3A and 3A' to which an operation nut 12A for moving each moving hood 12 is screwed.

With such a configuration, the cover member 20 can be fixed without rattling at the time of use, and even in the stored state, the cover member 20 can be caused to abut on the opening end edge of the cover member screwed with the male screw portion 3A', so that the position of the cover member 20 can be fixed without rattling while the reel leg is fixed to the reel leg placement portion 9a. In addition, in the stored state, the dimension when stored can be adjusted by changing the screwing position.

FIG. 10 is a view illustrating a sixth embodiment, in which FIG. 10A is a view illustrating a state of being used as a fishing rod and FIG. 10B is a view illustrating a stored state.

In this embodiment, the original rod 3 storing a plurality of rods is attached inside the reel seat 9 formed in a cylindrical shape. A moving hood 12 is provided on a front side (rod tip side) of the reel leg placement portion 9a of the reel seat 9, and a fixed hood 11 is provided on a rear side (proximal end side) thereof. Further, on the rear side of the fixed hood 11, a separate joining component 70 is attached without forming the protruding portion 3B as in the above-described embodiment. The joining component 70 comprises a cylindrical portion 71 fixed to a radially inner side of the fixed hood 11 and enlarged in diameter on the rear side of the fixed hood 11, and a female screw portion 72 is formed on an inner surface of the cylindrical portion 71.

By screwing and coupling a dish-shaped screw-in type lower plug 90 in which a coin groove 91 is formed on the back side of the female screw portion 72, it is possible to reliably prevent the original rod 3 and the like from popping out in the stored state.

The original rod 3 is preferably configured to have a length that does not protrude from the rear end of the reel seat 9, and the front side thereof is fixed in a state of protruding from the male screw portion 3A to which the operation nut 12A of the moving hood 12 disposed on the reel seat 9 is screwed.

In the cover member 20, as in the second embodiment (see FIGS. 5 and 6), a female screw portion 26 is formed on an inner surface of an opening portion at a distal end thereof, and a male screw portion 25 is formed to protrude forward from a region where the female screw portion 26 is formed. As illustrated in FIG. 10A, the male screw portion 25 is configured to be screwed with the female screw portion 72 of the joining component 70 when used as a fishing rod. In addition, as illustrated in FIG. 10B, the female screw portion 26 of the cover member 20 is screwed with the exposed male screw portion 3A, so that it can be brought into a stored state.

In this case, the dimension when stored can be adjusted by axially shifting the screwing position between the female screw portion 26 of the cover member 20 and the male screw portion 3A.

With the above configuration, since the protruding portion is not formed on the rear side of the reel seat 9, it is possible to shorten the dimension of the fishing rod when stored.

Figure 11:
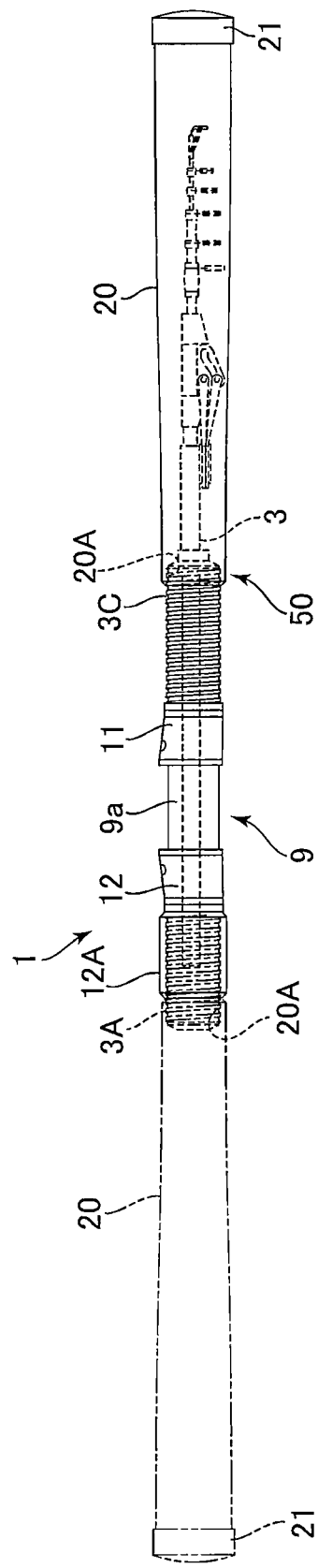
FIG. 11 is a view illustrating a seventh embodiment of the fishing rod according to the present invention, and is a view illustrating a stored state.

FIG. 11 is a view illustrating a seventh embodiment.

In this embodiment, a fixed hood 11 is provided on the front side of the reel leg placement portion 9a, and a moving hood 12 is provided on the rear side. Similarly to the sixth embodiment, the rear side of the moving hood 12 is terminated as it is by the male screw portion 3A to which the operation nut 12A is screwed without forming a protruding portion. The female screw portion 20A of the cover member 20 is screwed with the male screw portion 3A to bring the fishing rod into a use state. The length of the original rod 3 is preferably a length that does not protrude from the rear end of the male screw portion 3A.

In addition, a male screw portion 3C is formed on the front side of the fixed hood 11, and the female screw portion 20A of the cover member 20 is screwed with this portion, so that it can be brought into a stored state. In this case, the dimension when stored can be adjusted by axially shifting the screwing position between the female screw portion 20A of the cover member 20 and the male screw portion 3C.

Also in the above configuration, the dimension of the fishing rod when stored can be shortened.

Figure 12:
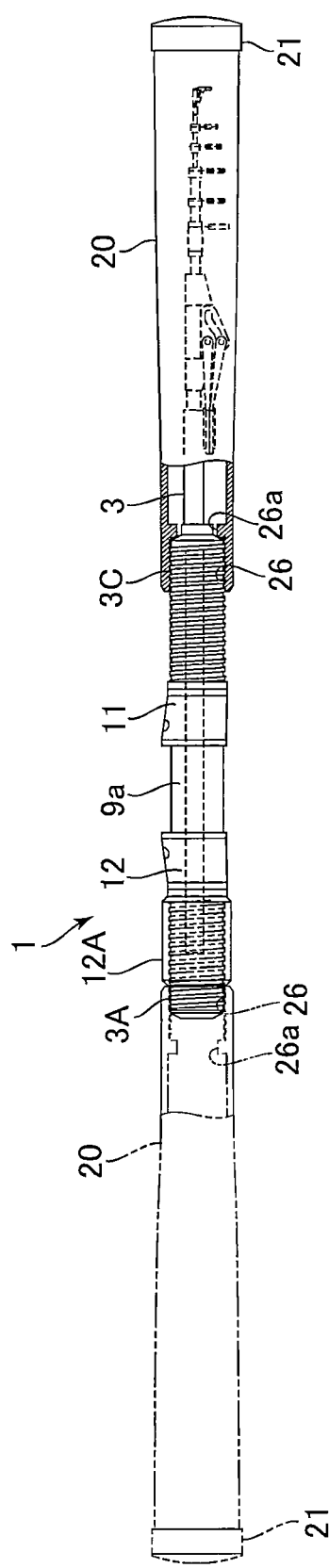
FIG. 12 is a view illustrating an eighth embodiment of the fishing rod according to the present invention, and is a view illustrating a stored state.

FIG. 12 is a view illustrating an eighth embodiment.

In this embodiment, in the seventh embodiment, the female screw portion 26 is formed in the opening region of the cover member 20, and the step portion 26a protruding in the radial direction is formed on the back side thereof.

When the female screw portion 26 of the cover member 20 is screwed and fastened to the male screw portion 3C formed on the front side of the fixed hood 11 when bringing it into a stored state, the step portion 26a is pressed and caused to abut on the distal end edge of the male screw portion 3C.

With such a configuration, it is possible to prevent the cover member 20 from rattling and to reliably fix the position of the cover member when brought into a stored state.

Figure 13A:
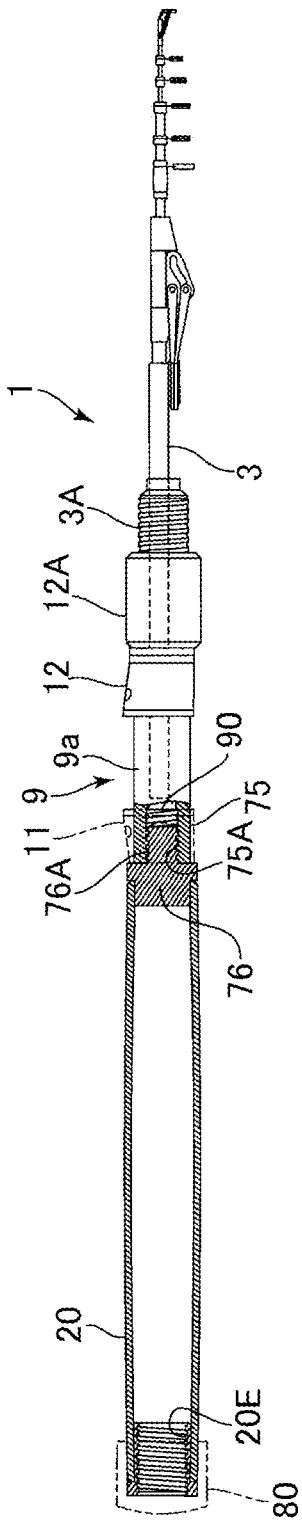
FIG. 13A is a view illustrating a state of being used as a fishing rod and FIG. 13B is a view illustrating a stored state.
Figure 13B:
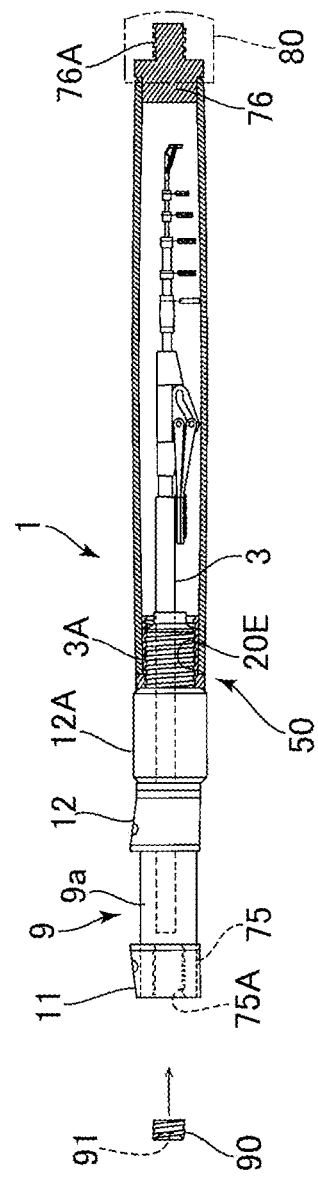

FIG. 13 is a view illustrating a ninth embodiment, in which FIG. 13A is a view illustrating a state of being used as a fishing rod and FIG. 13B is a view illustrating a stored state.

In this embodiment, the moving hood 12 is provided on the front side of the reel leg placement portion 9a, and the fixed hood 11 is provided on the rear side.

On a radially inner side of the fixed hood 11, a plug 75 is attached so as to close the opening of the reel seat, and a female screw portion 75A is formed at the central portion thereof. Further, a joining component 76 is press-fitted and fixed to an opening portion of the cover member 20, and a male screw portion 76A is formed to protrude in a central portion thereof so as to be screwed with the female screw portion 75A of the plug 75. Further, a rear end side of the cover member 20 is opened, and a female screw portion 20E is formed on an inner surface portion thereof.

With such a configuration, at the time of use, the male screw portion 76A of the joining component 76 of the cover member 20 is screwed with the female screw portion 75A of the plug 75 to form a grip (see FIG. 13A). In addition, the cover member 20 is removed, and the female screw portion 20E on the rear end side is screwed with the male screw portion 3A of the moving hood 12, so that it can be brought into a stored state. In this stored state, it is possible to adjust the dimension when stored by changing the screwing position.

Note that the cap member 80 may be detachably attached to the cover member 20 so as not to expose the joining component 76 in the stored state. In addition, similarly to the embodiment illustrated in FIG. 10, by screwing and coupling a dish-shaped screw-in type lower plug 90 in which a coin groove 91 is formed on the back side of the female screw portion 75A, it is possible to reliably prevent the original rod 3 and the like from popping out in the stored state.

With the configuration as described above, it is possible to shorten the dimensions when stored and join the screwed portions at a radial central portion, so that it is possible to reduce the diameter.

The embodiment of the present invention has been described above; however, the present invention is not limited to the embodiment described above, and can be modified in various forms.

In the embodiment described above, the fishing rod to which the reel is attached has been exemplified, but the fishing rod can be configured as a normal telescopic fishing rod not including a reel seat and fishing line guides. In addition, it may be configured as a fishing rod dedicated to a double-bearing reel, or may be configured as a fishing rod to which both a spinning reel and a double-bearing reel are attached. In this case, it is only necessary to change the configuration of the fishing line guides according to the reel to be attached.

The length of the cover member 20 can be appropriately modified. In addition, regarding the method of fixing the cover member 20 to the original rod 3, in addition to the screwing structure, a press-fitting structure, a structure by a clamp, and the like can be appropriately modified, and the configuration of the adjustment mechanism 50 can also be appropriately modified accordingly. In addition, various constituent members in each of the above-described embodiments can be applied to other embodiments.

REFERENCE SIGNS LIST

1 Fishing rod
3 Original rod (rod)
3A Male screw portion
5A to 5D Rod
8A, 8B, 8C Fishing line guide
9 Reel seat
9a Reel leg placement portion
11 Fixed hood
12 Moving hood
12A Operation nut
20 Cover member
20A Female screw portion
30, 30' Ring nut
50 Adjustment mechanism

The invention claimed is:

1. A fishing rod comprising a cylindrical cover member attached to an original rod storing a plurality of rods so that the plurality of rods does not protrude, the cover member being capable of constituting a rear grip attached to and detached from the original rod, wherein the original rod and the cover member are provided with an adjustment mechanism capable of adjusting a dimension when stored by changing an attachment position of the cover member when the cover member is attached to the original rod.

2. The fishing rod according to claim 1, wherein the adjustment mechanism comprises a female screw portion formed on an inner surface of an opening region of the cover member, and a male screw portion on which an operation nut of a moving hood for fixing a reel leg of a fishing reel is disposed.

3. The fishing rod according to claim 2, wherein an opening end edge of the cover member abuts on a distal end edge of the operation nut to fix an axial position of the cover member.

4. The fishing rod according to claim 3, wherein at least one of the opening end edge of the cover member or the distal end edge of the operation nut is provided with a soft member interposed therebetween.

5. The fishing rod according to claim 2, wherein a ring nut is disposed on the male screw portion on which an operation nut of a moving hood of the original rod is disposed.

6. The fishing rod according to claim 2, wherein the original rod comprises a protruding portion protruding in an axial direction on a rear side of a portion where the reel leg is fixed, and a male screw portion for a rear grip with which a female screw portion formed on an inner surface of an opening region of the cover member is screwed is formed in the protruding portion.

7. The fishing rod according to claim 1, wherein the adjustment mechanism comprises a male screw portion formed in an opening region of the cover member, and a female screw portion disposed adjacent to a fixed hood for fixing a reel leg of a fishing reel.

8. The fishing rod according to claim 1, wherein the cover member is provided with a flexible member to which a distal end of each of the rods abuts in a storage state of the plurality of rods.

9. A fishing rod comprising:
a reel seat comprising a reel leg placement portion for fixing a reel leg of a fishing reel, and a pair of hoods provided on a front side and a rear side of the reel leg placement portion for fastening and fixing the reel leg;
an original rod integrated with the reel seat and storing a plurality of rods; and
a cylindrical cover member to which the plurality of rods is attached so as not to protrude, wherein
the cover member is capable of constituting a rear grip to be attached to and detached from the reel seat or the original rod, and
the reel seat or the original rod and the cover member are provided with an adjustment mechanism capable of adjusting a dimension when stored by changing an attachment position of the cover member.

10. The fishing rod according to claim 9, wherein
a male screw portion or a female screw portion is provided in a hood region on a front side of the pair of hoods, and
a female screw portion or a male screw portion screwed with the male screw portion or the female screw portion formed in the hood region is formed at an end portion of the cover member.

* * * * *